June 6, 1950

W. E. TRAMMELL
ATTACHMENT FOR FASTENING TABLES
TO AUTOMOBILE INSTRUMENT PANELS 2,510,436

Filed Nov. 19, 1946

INVENTOR.
WM. E. TRAMMELL
BY *Jewett and Mead*
ATTORNEYS.

Patented June 6, 1950

2,510,436

UNITED STATES PATENT OFFICE 2,510,436

ATTACHMENT FOR FASTENING TABLES TO AUTOMOBILE INSTRUMENT PANELS

William Earnest Trammell, Atlanta, Ga.

Application November 19, 1946, Serial No. 710,868

1 Claim. (Cl. 311—21)

The invention relates to tables which may be supported by a bracket arm secured to any desired structure by means having substantially universal movement.

It is an object of the invention to provide a structure of the class referred to particularly adaptable to use in vehicles, as automobiles or buses.

It is a further object of the invention to provide a table of a tray character which may be folded out of the way when not in use.

It is a further object of the invention to provide a table of the character referred to that may be adjusted for height as well as for level and securely clamped in adjusted position.

Further objects will appear from the following description when read in connection with the accompanying drawing showing an illustrative embodiment of the invention and wherein.

Figure 1:
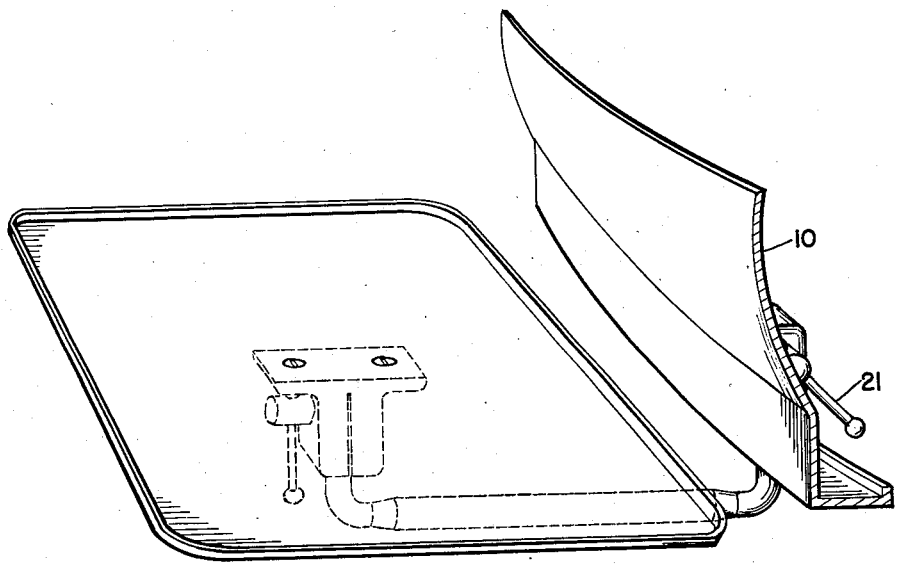
Figure 1 shows a table embodying the invention and secured to an automobile dash.
Figure 2:
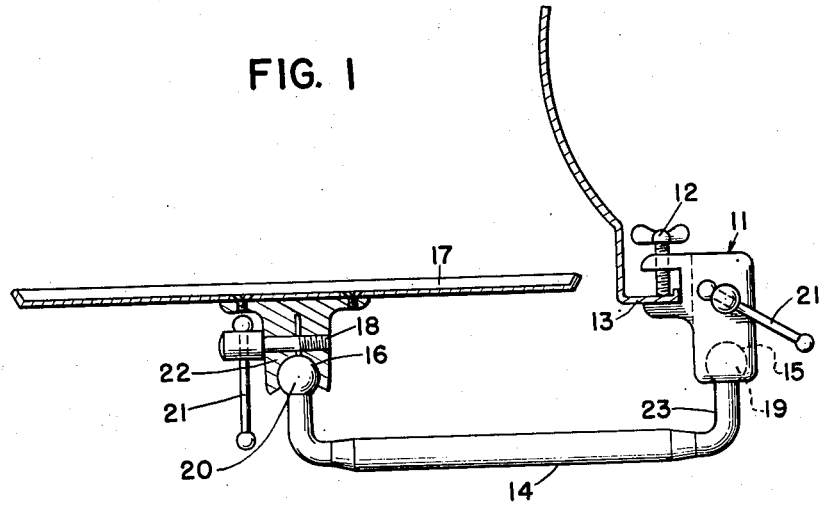
Fig. 2 is a vertical transverse section of the structure of Figure 1 showing the bracket arm and one socket in elevation.

For purpose of illustration, the device is shown as applied to an automobile dash 10 by the provision of a C clamp 11 with a wing bolt 12, the clamp being shown as applied to the back-turned edge 13 of the automobile dash 10. To support the bracket arm 14 upon the C clamp, the latter is formed with a socket 15 in the manner similar to that shown for socket 16 shown as directly supporting the table top 17.

As shown, the socket is split and a clamp screw 18 is provided to cause the split socket to clamp the ball head 19 or 20 seated in the socket.

Movable hand levers 21 are shown to fix the parts in position. The table 17 is shown as secured to the socket member 22 by screws. It is obvious that the socket 11 may be given various forms in accordance with the structure upon which the table is to be supported.

The supporting socket 11 instead of having the C clamp may have a base similar to the socket 22 as shown, which base may be screwed to a vertical surface as for instance to the back of the front seat of an automobile and may be folded by swinging the table to a vertical position and then swinging the arm 14 until the table lies flat against the back of the seat to which the socket is secured.

Figure 3:
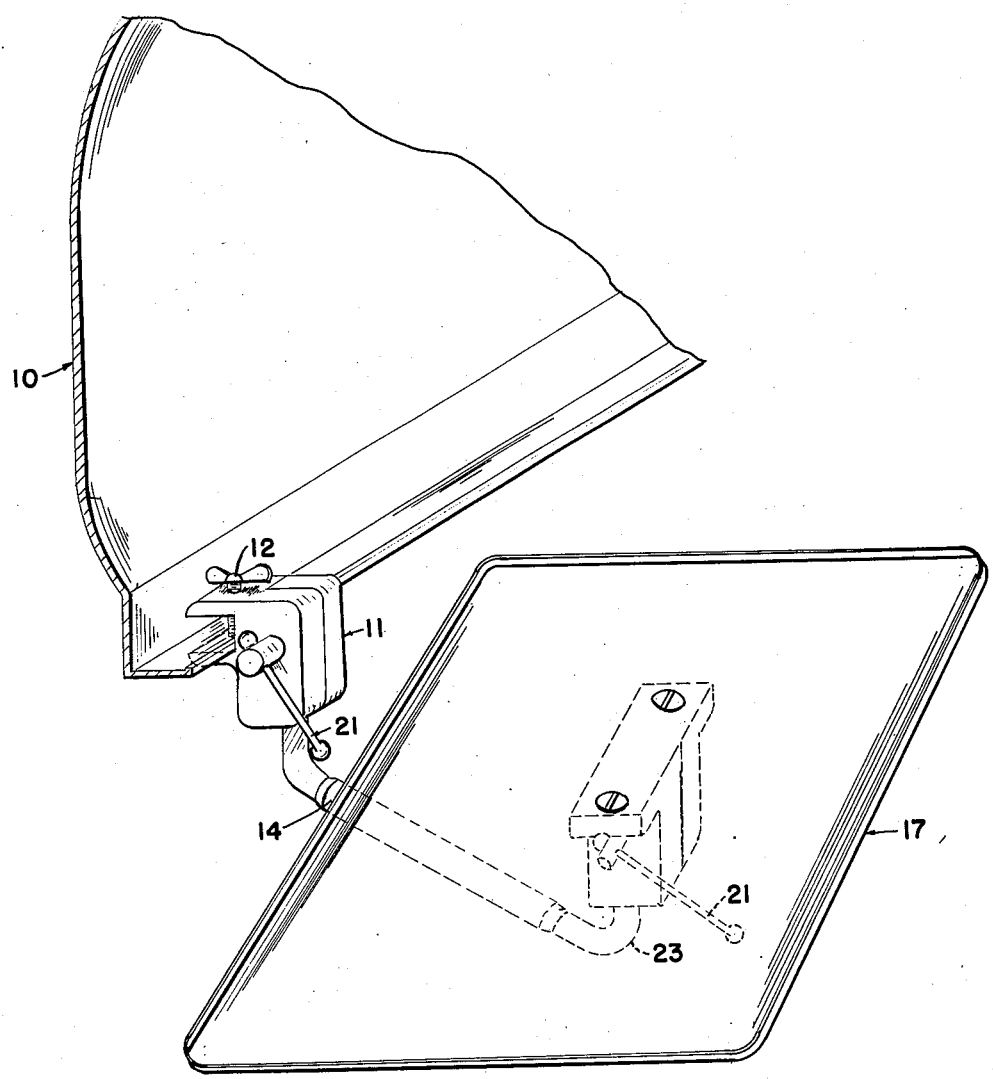
Fig. 3 is a view from the rear of the structure of Figure 1 showing the device folded under the automobile dash.

To fold the table when supported in the manner shown in Figure 1, the table may be lowered about the socket 15 and then may be swung about the vertical portion 23 of arm 14 to the position shown in Fig. 3 where it will underlie the instrument board and be out of the way although ready for immediate use.

When the device is in the position shown in Figure 1, it may be raised or lowered by moving the arm 14 in the plane of its horizontal element with movement of the ball 19 in socket 15. When so adjusted, the tray may be leveled with movement of ball 20 in socket 16 and the parts may be clamped in their adjusted positions by virtue of the bolts 18 and the levers 21.

Minor changes may be made in the physical embodiments of the invention within the scope of the appended claim without departing from the spirit of the invention.

I claim:

A table structure for attachment to an automobile dash comprising, in combination: a C clamp for engagement with a dash margin, and formed with a downwardly opening, divided ball socket; means to constrict said socket to clamp a ball member therein; a table supporting arm having an upwardly directed end portion terminating in a ball for reception in said socket, and a laterally extending portion projecting at an angle to said end portion; said arm having an upwardly extending opposite end portion; a jointball carried by the last named end portion; a tray member; a divided, downwardly opening ball socket member formed with a base extending at substantially a right angle with the axis of the socket of the member; said base secured to a tray member; said last named ball engaged in the last named downwardly opening socket, means to constrict said last named socket to clamp the last named ball; whereby said arm carrying the tray may be adjusted relatively to the horizontal and with the tray standing in a plane lower than the dash margin may be swung about a vertical axis to a position below the instrument panel.

WILLIAM EARNEST TRAMMELL.

REFERENCES CITED

The following references are of record in the file of this patent:

UNITED STATES PATENTS

| Number | Name | Date |
|---|---|---|
| 354,976 | Field | Dec. 28, 1886 |
| 357,337 | Rosenblatt | Feb. 8, 1887 |
| 688,230 | Isgrig et al. | Dec. 3, 1901 |
| 775,003 | Eustis | Nov. 15, 1904 |
| 1,518,956 | Beitman | Dec. 9, 1924 |
| 1,900,325 | Bayman | Mar. 7, 1933 |
| 2,270,948 | Howe | Jan. 27, 1942 |